Figure 1:
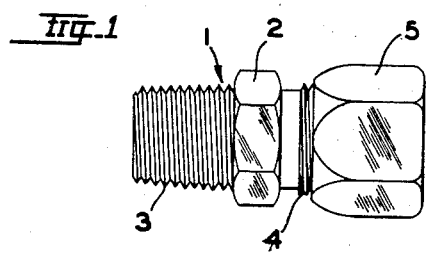

INVENTOR.
LELAND H. SCHMOHL
BY
Oberlin, Maky & Donnelly
ATTORNEYS

United States Patent Office 3,120,969
Patented Feb. 11, 1964

3,120,969
FLARELESS TUBE COUPLING
Leland H. Schmohl, Moreland Hills, Ohio, assignor to Parker-Hannifin Corporation, Cleveland, Ohio, a corporation of Ohio
Filed May 12, 1959, Ser. No. 812,623
4 Claims. (Cl. 285—341)

The present invention relates generally as indicated to a flareless tube coupling and more particularly to a flareless tube coupling of the type which employs a sleeve or ferrule which at one end is adapted to be radially contracted into gripping and sealing engagment with the surface of the tube which is to be joined to the coupling assembly, and which, at the other end, is adapted to be deformed into frictional engagement with the tube in a manner so as to effectively dampen vibrations in the tube at a zone axially spaced from the zone where the ferrule is in gripping and sealing engagement with the tube.

It is a principal object of this invention to provide a simple three piece flareless tube coupling, viz., a body, a nut, and a ferrule, characterized in that these parts are so formed that tightening of the nut effects axial advance of the ferrule against the flare mouth of the body to cause radial contraction of the front end of the ferrule into gripping and sealing engagement with the tube and radially contraction of the rear end of the ferrule into vibration damping contact with the tube.

It is another object of this invention to provide a flareless tube coupling that has a ferrule provided with a tubular gripping and sealing end radially outwardly offset with respect to the rearwardly adjacent portion so as to be readily contractible up to the point where proper gripping and sealing contact is obtained but not so readily contractible thereafter whereby overtightening may be avoided.

It is another object of this invention to provide a flareless tube coupling in which the ferrule thereof has a head at its rear or outer end engaged by the nut and is formed with an annular groove adjacent said head which is arranged to cause said head to turn in and cause the grooved portion to contract against the tube into vibration damping contact therewith.

It is another object to provide a flareless tube coupling in which the sleeve has an enlarged head at the rear end thereof, with a grooved portion adjacent thereto, which head has an end surface initially engageable in line contact at its outer diameter with a shoulder surface on the nut, and in which tightening of the nut turns the sleeve head to contract the grooved portion against the tube in vibration dampening contact therewith, and in which excessive turning in of the sleeve head due to excessive tightening of the nut is avoided by reason of full surface engagement being established between said nut and sleeve surfaces.

It is another object to provide a flareless tube coupling in which the sleeve has an enlarged head at the rear thereof with a grooved portion adjacent thereto, and which head is deformable by contact with the nut so as to cause the grooved portion to contract into engagement with the tube, and said sleeve has a cylindrical front section which is readily deformable by a tapered surface of the fitting body into tight gripping and sealing engagement with the tube, and in which the sleeve has a tapered intermediate portion with the ends of said intermediate tapered portion being of lesser and greater diameter respectively than said cylindrical portion, whereby upon normal tightening of the nut the tapered intermediate portion will remain out of contact with said body taper immediately adjacent the cylindrical portion but will contact the body taper between the ends of said tapered intermediate portion to prevent uncontrolled expansion of said intermediate portion and for rapidly increasing the amount of torque required to turn the nut and thus provide a "home" feeling when the nut has been tightened the proper amount.

It is another object to provide a flareless tube coupling in which the sleeve has a cylindrical front portion counterbored to provide an annular cutting edge longitudinally spaced from the front end of the sleeve, and in which the sleeve has an intermediate tapered portion, said tapered portion being of smaller diameter than said cylindrical portion at the region adjacent thereto so as to form a neck slightly rearwardly of said cutting edge, said cylindrical portion being contractible by contact with a tapered mouth in the fitting body, said neck facilitating contraction of said cylindrical portions in the region of said cutting edge whereby the latter is contracted into gripping engagement with the tube.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 2:
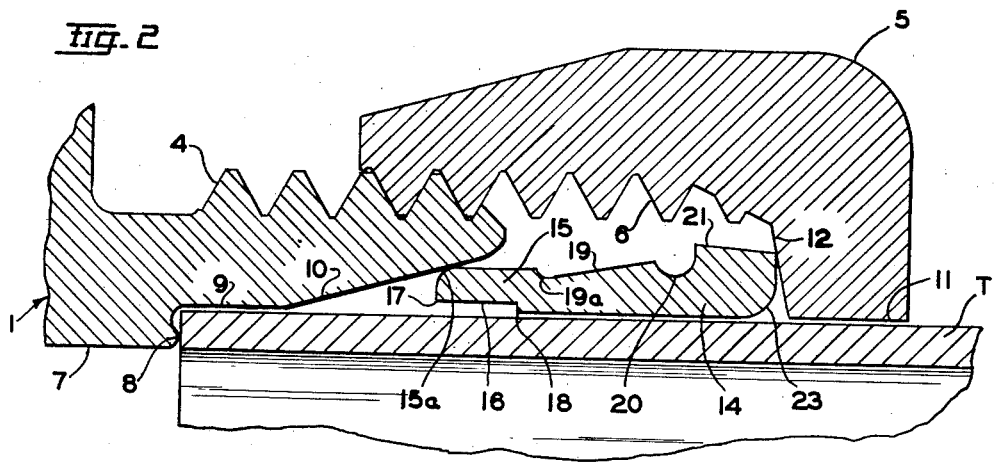
Figure 3:
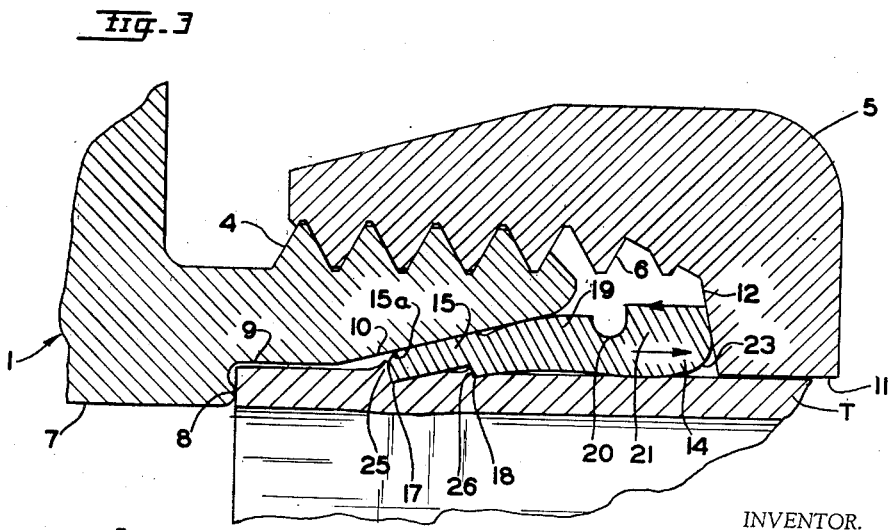

In said annexed drawing:

FIG. 1 is a side elevation view of a flareless tube coupling assembly constituting the present invention;

FIG. 2 is a much enlarged fragmentary radial cross-section view showing the relative positions of the coupling parts in the finger-tight position of the nut thereof; and FIG. 3 is a similar enlarged fragmentary radial cross-section view showing the fully assembled condition of the coupling parts with the ferrule contracted to make firm gripping and sealing engagement with the tube and sealing engagement with the flare mouth of the body at one end and vibration damping engagement with the tube at the other end.

Referring now more particularly to the drawing, the flareless tube coupling herein comprises a body 1 provided, for example, with a wrench-engaging portion 2 between its ends and tapered pipe threads 3 or the like, and uniform pitch diameter male threads 4 at its respective ends, and a nut 5 formed with female threads 6 engaged with threads 4.

As clearly shown in FIGS. 2 and 3, the body 1 is formed with a bore 7 therethrough, an internal abutment shoulder 8 for an end of a tube T, a counterbore 9 adjacent said shoulder 8, and a countersink or flare mouth 10 which, as hereinafter explained, constitutes a cam surface.

On the other hand, the internally threaded nut 5 is formed with a bore 11, through which the tube T extends, and with an internal shoulder 12 which preferably is tapered as shown.

Between the body 1 and nut 5 and surrounding the tube T and disposed to engage the flare mouth 10 of the body 1 and the tapered internal shoulder 12 of the nut 5 is a sleeve or ferrule 14.

Referring especially to FIG. 2, the tube T has been inserted through the nut bore 11, the ferrule 14, and into the body counterbore 9 in abutting engagement with the internal shoulder 8, and the nut 5 has been finger-tightened on the body 1 so that the opposite ends of the ferrule 14 are in engagement with the flare mouth 10 and the tapered internal shoulder 12 respectively.

The forward end portion 15 of the ferrule 14 is substantially cylindrical, the cylindrical portion being of substantial length and having a radiused outer corner 15a which initially engages flare mouth 10. The cylindrical portion 15 has a counterbore 16 which provides two radially offset and axially spaced apart sharp corners 17 and 18 which, as hereinafter explained, are adapted to bite into the surface of the tube T and to plow up ridges or shoulders of the tube metal so to provide fluid seals and strong holding shoulders which effectively resist pull-out of the tube T from the coupling assembly after the nut 5 has been tightened as in FIG. 3.

Adjacent the cylindrical portion 15 of the ferrule is an intermediate tapered portion 19, said taper being less than the taper of the body portion 10, the latter preferably being about 12 degrees and the taper of the intermediate sleeve portion 19 being preferably about 10 degrees. The forward or small end of the tapered portion 19 is of smaller diameter than the cylindrical portion 15 and the large end of the tapered portion 19 is of greater diameter than the cylindrical section 15. The small end of the tapered portion 19 in effect provides a neck portion 19a adjacent the cylindrical portion 15 about which the cylindrical portion pivots as it is deformed by the body taper 10.

Adjacent the thick end of such tapered portion, the ferrule 14 is formed with a peripheral groove 20 which provides another neck portion, and with a radially enlarged head 21, the outer surface of which is tapered in a radially inward and axially outward direction as shown in FIG. 2. The outer or rear end of the ferrule 14 is preferably cut off square and the inner corner 23 is generally rounded as shown.

Accordingly, as shown in FIG. 2, the outer corner of the head 21 of the ferrule 14 has line contact with the internal tapered shoulder 12 of the nut 5 at a diameter which is preferably greater than the diameter of contact of the rounded corner 15a at the inner end of the ferrule 14 with tthe flare mouth 10.

It can now be seen that when the nut 5 is in finger-tight position, the ferrule 14 will be positioned coaxially of the body 1 and nut 5 by reason of the engagement of the opposite ends thereof with the frusto-conical tapered surfaces of the flare mouth 10 and internal shoulder 12 and of course the tube T will be centered by counterbore 9 and the through bore of ferrule 14.

When the nut 5 is tightened, the axial force exerted thereby around the line contact of the head 21 with the internal shoulder 12 will cause the ferrule 14 to be axially advanced into the flare mouth 10 thereby causing the enlarged cylindrical end portion to be progressively deformed as cantilever beams about neck 19a to frusto-conical form, as clearly shown in FIG. 3, and first, the sharp corner 17 contacts the surface of the tube T to progressively build up a holding shoulder 25 of tube metal, while at the same time the end of the tube T is firmly pressed against the internal shoulder 8 in the body 1. Finally, before the nut 5 has been tightened to the extent shown in FIG. 3, the other sharp corner 18 will, likewise, become embedded in the surface of the tube T to create a second sealing and holding shoulder 26. However, at that time the entire cylindrical end portion of the ferrule 14 has been deformed to frusto-conical form and into engagement with the tube T, and the intermediate tapered portion 19 has arched slightly outwardly and advanced into contact with the tapered flare mouth 10 whereby very little additional radial contraction of the initially cylindrical portion 15 will be effected thereafter even by application of a substantially increased tightening torque on the nut 5.

When the nut 5 has been tightened to this extent there has been a substantial force coupling (composed of radially offset axial forces acting as indicated by the arrows) imposed on the head 21 of the ferrule 14 which is effective to turn the head 21 inwardly about its zone of engagement with the tapered internal shoulder 12 of the nut 5, whereby the yielding or deformation of the ferrule at the region of the peripheral groove 20 will cause the bore portion in the head end of the ferrule 14 to contract radially to provide a gradually releasing frictional grip on the outer surface of the tube T to effectively resist or dampen vibrations. This prevents vibrations from causing failure of the tube T at or adjacent the holding shoulders 25 and 26.

The apex angles or angles of taper of the flare mouth 10 and of the internal shoulder 12 are of considerable importance to proper operation of the coupling in that to effect desired biting action of the corners 17 and 18 into the surface of the tube T to create the sealing and pull-out resisting ridges or shoulders 25 and 26 requires a "wedge-taper" of the flare mouth 10 so that there will be a substantial force multiplication whereby a predetermined axial force on the ferrule 14 will result in a much greater radial inward force component to cause contraction while the attitude of the corners 17 and 18 is such as to induce a "plowing" action which progressively builds up the shoulders 25 and 26 as the ferrule is thus axially advanced and radially contracted at its inner end. By the same token, the internal shoulder 12 in the nut 5 is tapered to set up a radial wedge angle relationship with the outer end of the ferrule 14 so that as the coupling is being made up large axial forces may be exerted through the nut 5 without prematurely contracting the outer end of the ferrule 14. This relationship at the head 21 and shoulder 12 induces the aforedescribed swinging or tipping action of the head 21 of the ferrule 14 about the outer zone of axial force application with respect to the inner zone of axial reacting forces. Accordingly, the ferrule 14, by the time it has been properly contracted into biting and sealing engagement with the tube T, is placed under a high degree of axial compression which is sufficient to cause a radial contraction at the groove 20 thereof and consequent swinging in of the adjacent portion of the head 21 about the outer zone of axial force application on said head.

By again referring to FIG. 3, it will be noted that under normal tightening the sleeve head 21 swings or tips so that the rear portion of the sleeve is contracted into vibration dampening contact with the tube and the sleeve head is tipped to such an extent that the outer end face of the sleeve head coincides with the shoulder surface 12 of the nut so as to establish full surface contact therebetween. This eliminates the couple action referred to above so that further tightening of the nut results in substantially no additional tipping or swinging in of the sleeve head. The bringing about of such surface contact has the effect of discontinuing or limiting such tipping and thus limits the amount of contraction of the sleeve head against the tube so that the tube will be gripped tightly enough to prevent vibration strains on the tube from reaching the sealing edges 17 and 18 but not tightly enough to objectionally contract the tube or grip it so firmly that stress concentrations will cause early failure at this region due to vibration induced stress concentrations.

By further reference to FIG. 3, it will be noted that with the front and rear sections of the sleeve contracted against the tube, the sleeve has a somewhat arched configuration and that the contact of the body taper 10 with the intermediate portion 19 prevents outward buckling of the latter. Such arching also results in a spring action which tends to lock the nut against loosening under vibration.

From the foregoing, it is clear that where the tube end is cut off cleanly and squarely there may be a fluid-tight seal effected between the end of the tube T and the internal shoulder 8 of the body 1. Further seals are obtained where the corners 17 and 18 of the ferrule 14 are embedded in the surface of the tube T and where the relatively initially wide cylindrical surface 15 of the ferrule 14 is in intimate contact with the flare mouth 10. Such wide area contact precludes gouging or damage to the flare mouth 10 by the ferrule 14, whereby the body 1 may be repeatedly assembled and disassembled and even be used with new ferrules and tubes.

By way of example, the body 1, nut 5, and ferrule 14, may be fabricated as of commercial brass for use with conventional copper tubing such as is used in automotive fluid systems and in hydraulic systems in the machine tool art. Of course, other materials may be used depending upon the service to which the coupling assembly is to be put, and according to the material from which the tube T is made. Thus, for high pressure systems or systems handling corrosive fluids, the tube T may be of stainless steel, or the like, and in that case the body 1, nut 5, and ferrule 14 likewise, will be made of corrosion-resisting material but preferably at least the ferrule will be material which is harder than the tube T, so that the sharp corners 17 and 18 will readily bite into the surface of the tube T to plow up the necessary holding ridges 25 and 26.

By way of further example, couplings for 1/8", 3/16", 1/4", 5/16", 3/8", 1/2", 5/8", 3/4", and 1" tubing made in accordance with this invention should have the following dimensions:

| Dimension | Value |
|---|---|
| Taper of flare mouth 10 with respect to axis of body 1 | 10° to 15°, preferably 12°. |
| Taper of outer surface of head 21 | Approximately 5° to 7°. |
| Taper of internal shoulder 12 | 10° to 15°, preferably 12°. |
| Taper of ferrule from neck 19a to groove 20 | Preferably about 10° (usually 2° less than flare mouth 10). |
| Length (end to neck 19a) to thickness ratio of cylindrical offset end of ferrule 14 | Approximately 3:1 to 4:1. |
| Ratio of thickness at cylindrical portion of ferrule 14 to thickness at neck 19a | Approximately 1:1. |
| Ratio of thickness of ferrule at groove 20 to thickness at neck 19a | Approximately 1:1 to about 1.5:1. |
| Ratio of radial distance from tube T to outer corner of head 21 to radial distance from tube T to corner 15 | Approximately 1.5:1 to about 2.2:1. |
| Radial clearance from tube T to counterbore 16 | Approximately .007" for 1/8" and larger sizes up to about .012" for 1" size. |
| Ratio of length of cylindrical portion 15 with tapered portion 19 | Approximately 1:1 to about 1:1.5. |

The foregoing relationships have been found well suited for joining commercial grades of copper tube T to couplings comprising bodies 1, nuts 5, and ferrules 14 made as of brass.

The radially offset relation of the axial forces as denoted by the arrows effects yet another important result and that is that there is resilient bending or swinging of the head 21 in a counterclockwise direction as viewed in the drawings.

Upon loosening of the nut there will be a slight bending or swinging of the sleeve head in the opposite, i.e., clockwise, direction within the elastic limit of the sleeve head. Thus, there is a resilient contact of the sleeve head with the nut for providing an additional springlike action to resist loosening of the nut 5 by vibration or otherwise.

Other modes of applying the principle of the invention may be employed, change being made as regards the details described, provided the features stated in any of the following claims, or the equivalent of such, be employed.

I therefore particularly point out and distinctly claim as my invention:

1. A flareless tube coupling comprising first and second threadedly engaged coupling members defining a tube-end receiving cavity therebetween including an annular space around the tube with corresponding first and second tapered annular end walls that move axially toward each other when said members are screwed together; and a tubular ferrule in such space, said ferrule being counterbored at the end adjacent said first end wall to provide a leading edge that has a radial clearance with the tube and being formed with a generally cylindrical portion of substantial length and substantially uniform radial thickness which is of a diameter greater than the axially adjoining part of the intermediate portion of said ferrule, said intermediate portion having a taper of increasing radial thickness terminating in a peripheral groove, and a head of larger diameter than said cylindrical portion and said groove extending from said groove to the end of said ferrule, said head adapted to be initially contacted by said second end wall only along the periphery of its radially outer axial end edge, whereby, when said members are screwed together, said first end wall contracts end of said cylindrical portion forcing said leading edge into gripping engagement with said tube and said second end wall swings said head about said groove to radially contract the head end of the ferrule against said tube, said second end wall coming into full contact with the lateral end of said head.

2. A coupling according to claim 1 wherein said head has a gradual taper of increasing radial thickness from its end toward said groove.

3. A coupling according to claim 1 wherein said head is formed with a rounded inner corner to provide a gradually decreasing engagement with the tube in a direction axially toward said second end wall.

4. A coupling according to claim 1 wherein said intermediate tapered portion is engageable by said first end wall to resist further contraction of said cylindrical portion.

References Cited in the file of this patent

UNITED STATES PATENTS

| | | |
|---|---|---|
| 2,179,127 | Lauer | Nov. 17, 1939 |
| 2,211,856 | Kreidel | Aug. 20, 1940 |
| 2,287,889 | Krumsiek | June 30, 1942 |
| 2,496,510 | Wolfram | Feb. 7, 1950 |
| 2,536,745 | Herold | Jan. 2, 1951 |
| 2,791,452 | Watson | May 7, 1957 |
| 2,943,871 | St. Clair | July 5, 1960 |

FOREIGN PATENTS

| | | |
|---|---|---|
| 688,744 | Great Britain | Mar. 11, 1953 |